July 15, 1969          G. KIJINSKI          3,454,976
AUTOMATIC WINDOW WASHING SYSTEM
Filed Jan. 30, 1968          3 Sheets-Sheet 1
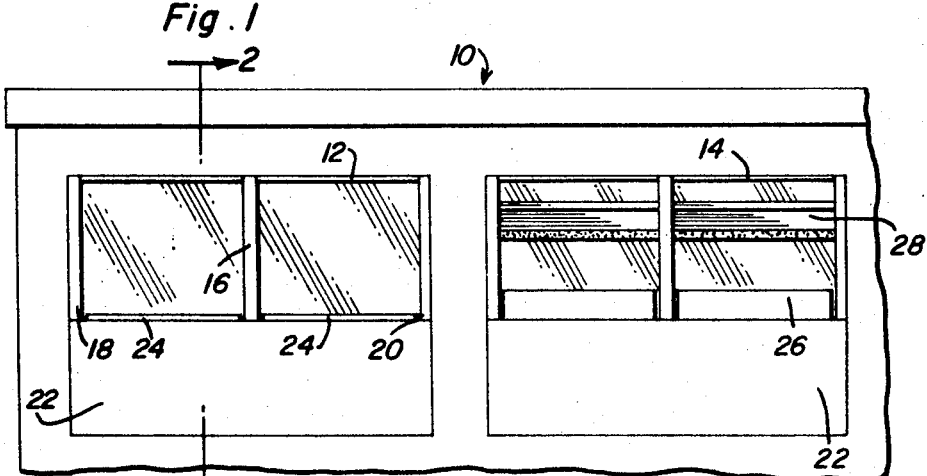
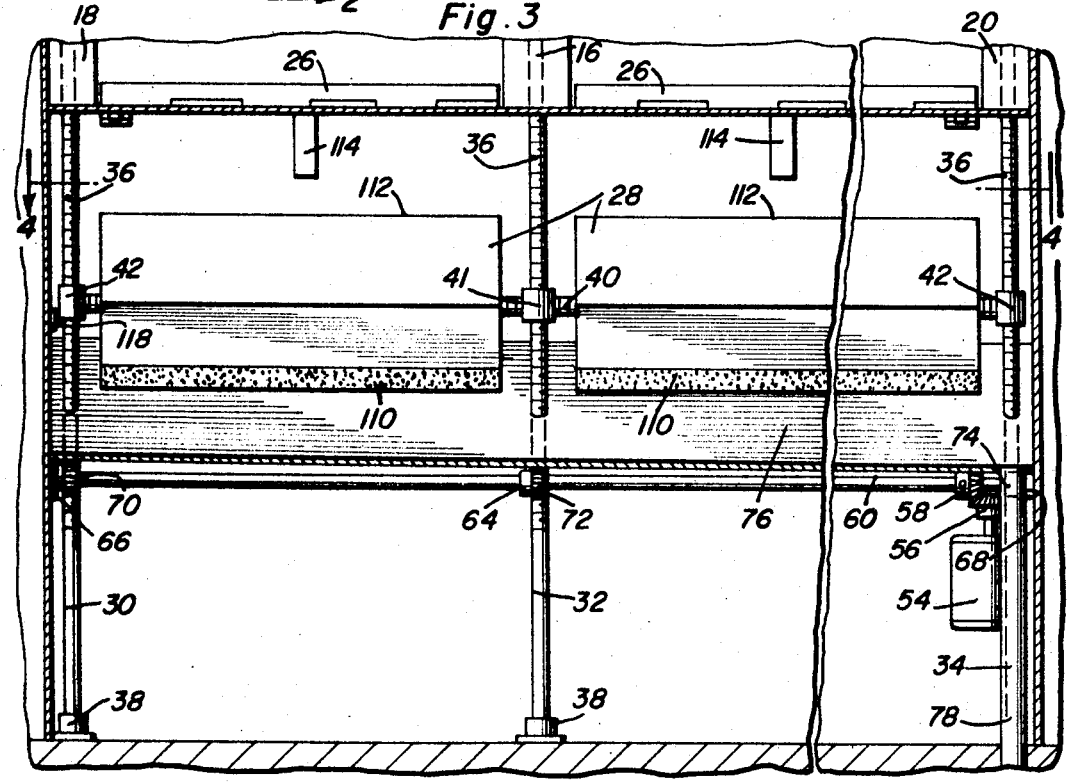
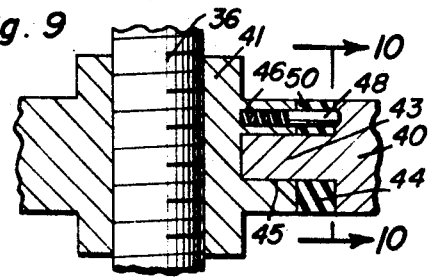
Gerald Kijinski
*INVENTOR.*
BY *Clarence A. O'Brien*
*and Harvey B. Jacobson*
         *Attorneys*

July 15, 1969  G. KIJINSKI  3,454,976
AUTOMATIC WINDOW WASHING SYSTEM
Filed Jan. 30, 1968  3 Sheets-Sheet 2
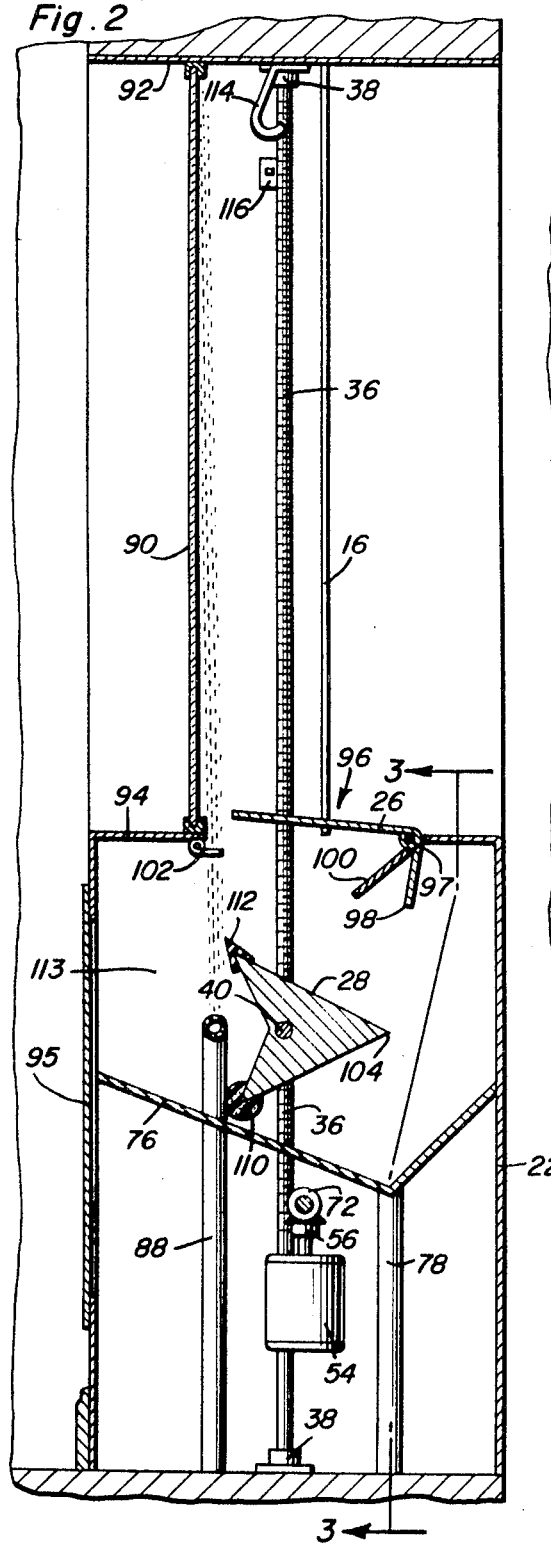
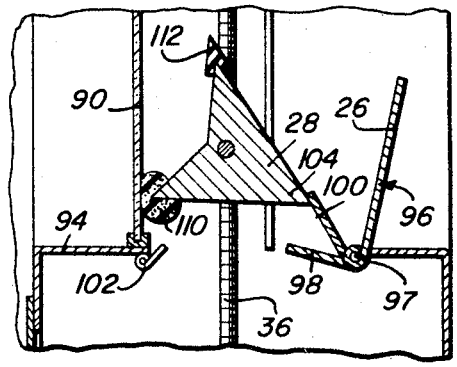
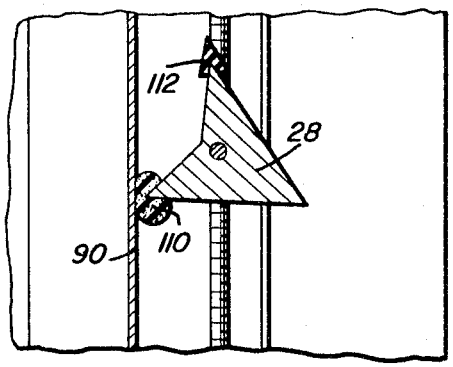
Gerald Kijinski
INVENTOR.
BY Clarence A. O'Brien
and Harvey B. Jacobson
Attorneys July 15, 1969  G. KIJINSKI  3,454,976
AUTOMATIC WINDOW WASHING SYSTEM
Filed Jan. 30, 1968  3 Sheets-Sheet 3
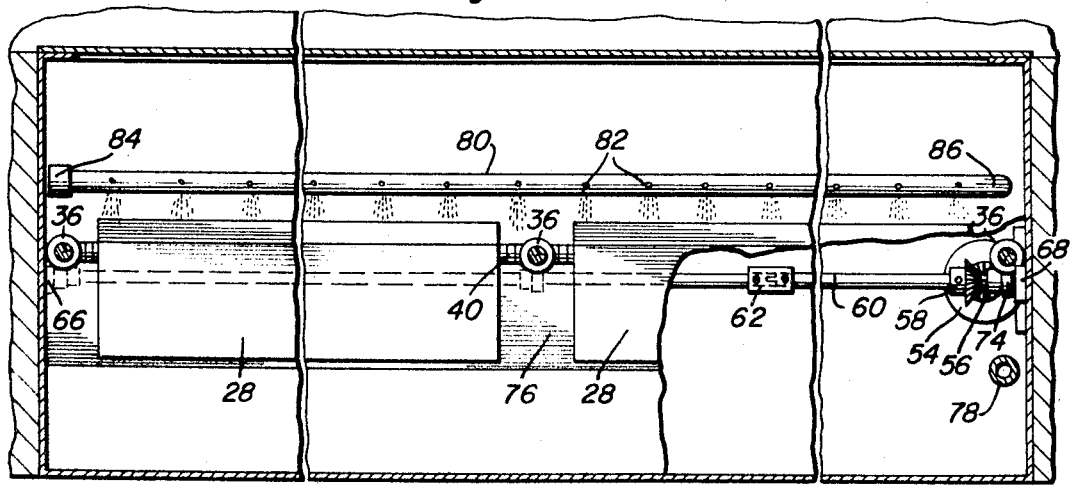
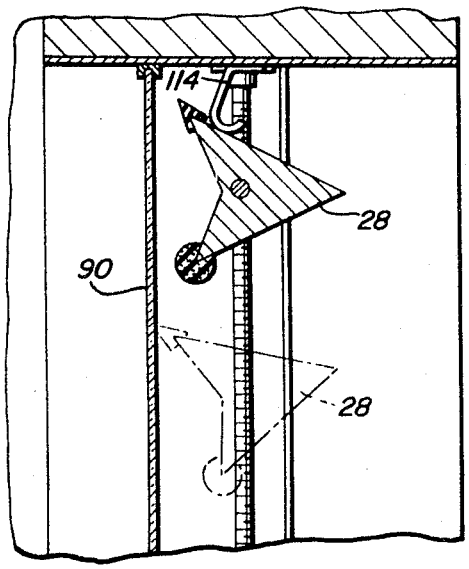
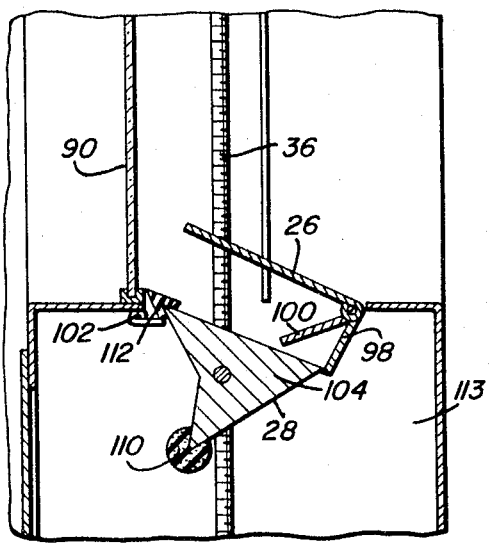
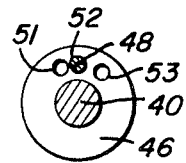
Gerald Kijinski
INVENTOR.

United States Patent Office 3,454,976
Patented July 15, 1969

3,454,976
AUTOMATIC WINDOW WASHING SYSTEM
Gerald Kijinski, 3947 E. 74th St.,
Cleveland, Ohio 44105
Filed Jan. 30, 1968, Ser. No. 701,693
Int. Cl. B60s 1/44, 1/46, 1/38
U.S. Cl. 15—250.01                                8 Claims

ABSTRACT OF THE DISCLOSURE

A window washing apparatus including a cleaning block, one edge having a sponge member, a second edge including a wiper blade. The block is supported between parallel worm gears driven by an electric motor. Upon synchronous rotation of the worm gears, the cleaning block vertically traverses a window pane. During an automatic cleaning cycle, the cleaning block is cammed to a position with the sponge in intimate contact with the window pane following a cleaning fluid applying phase. When the cleaning block reaches the top edge of the pane, a cam repositions the cleaning block so that the wiper blade contacts the pane during reverse travel of the block downwardly across the pane to the bottom edge thereof.

---

The present invention relates to the field of window washing apparatus and more particularly to an electrically powered automatic window washing system.

Mechanical window washing devices are old in the art. In one prior construction such as shown in U.S. Patent 1,689,163 issued on Oct. 3, 1938 to P. H. Sukert, a hand driven cleaning member involves simultaneous contact between a scrubbing member and a wiping member during the up and down strokes across a window so that frictional engagement of each member occurs for twice the period of time that is actually necessary. Thus, wear and deterioration of these members is unduly increased thereby resulting in a premature replacement of parts. More recent developments in the prior art such as shown in Patent 3,037,797 issued on May 8, 1962 to L. Presser continue to rely upon coacting scrubbing and wiping members. A large number of previous constructions also include parts permanently retained on an area of a window so that portions of the mechanism are exposed. As will be appreciated, such unsightly mechanical structures detract from the esthetic effect produced by modern architecture.

In summary, the present invention includes a plurality of parallel worm gears. A cleaning block is supported between adjacent parallel worm gears for displacement upwardly and downwardly across a window pane. Shielding panels are disposed outwardly of and in alignment with each of the worm gears so that their presence is not revealed by one looking toward the window. Further, a housing is provided beneath the window pane thereby providing a storage facility for the cleaning block when it is not in use. Upon initiation of an electrically driven gear train, the cleaning block is displaced upwardly until a cam engages a free edge of the block thereby positioning a second edge in intimate contact with the window pane during the continued upward displacement of the cleaning block. This second edge includes a sponge member thereon. A fluid spraying pipe is positioned to wet the window pane prior to traverse of the sponge member across the window pane. A limit switch is provided at a position on top of the window pane to reverse the direction of cleaning block displacement when the latter has reached the top edge of the window pane. At this point a cam contacts the cleaning block and repositions the same so that a third edge is positioned against the window pane in intimate contact therewith. This third edge includes a wiper blade thereon for wiping the wetting solution from the window pane during the downward displacement of the cleaning block. The cleaning block continues to travel downwardly until disposed within the aforementioned housing at which time a circuit switch renders the electrically driven gear drive inoperative thereby terminating a cleaning cycle. The cleaning block of the present invention affords simplicity in design and due to the alternate engagement between either the sponge member or wiping blade member with a window surface, the life of each member is greatly extended. Thus, the present invention reduces the maintenance and replacement costs of these members compared to prior art devices. Further, the housing provided by the present invention makes it possible to hide a window cleaning mechanism from sight thereby increasing the esthetic value of a building facade. A still further advantage of the present invention relates to the simple mechanical camming against an edge of the cleaning block which causes the same to alternately position the sponge and wiper members against a window pane.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a front elevational view showing two window structures. The left structure illustrates a hidden cleaning assembly while the right window structure illustrates the cleaning apparatus in operation during traverse of the window panes.

FIGURE 2 is an enlarged side sectional view taken along a plane passing through section line 2—2 of FIGURE 1.

FIGURE 3 is a front sectional view taken substantially through a plane indicated by section line 3—3 in FIGURE 2.

FIGURE 4 is a top sectional view taken substantially through a plane indicated by section line 4—4 in FIGURE 3.

FIGURES 5-8 are partial side sectional views showing the cleaning block in different operational positions.

FIGURE 9 is an enlarged sectional view of a portion of the cleaning apparatus showing the detent mechanism associated with the cleaning block.

FIGURE 10 is a transverse sectional view taken along a plane passing through section line 10—10 of FIGURE 9.

Referring specifically to the drawings, a preferred embodiment of the present invention is utilized in conjunction with window assemblies as shown in FIGURE 1 of the drawings. This figure shows a portion of a building facade generally denoted by the reference numeral 10. The left window assembly 12 illustrates the appearance of the same when the cleaning assembly of the present invention is not in use. The right window assembly 14 is illustrated with the present cleaning assembly in operation. Vertical support members for the cleaning assembly are hidden from view by means of a central post 16, a left post 18 and a right post 20. The cleaning assembly is stored within a housing behind the concealment panel 22. The sill shields 24 are normally positoned almost horizontally as shown on the left window assemblies. However, during operation of the cleaning assembly the sill shields are pivotally displaced upwardly to positions indicated by reference numeral 26 on the right window assembly as viewed in FIGURE 1 thereby permitting vertical displacement of the cleaning asembly from its lowered stored position.

FIGURE 3 illustrates the cleaning assembly employed to clean a wide window area. Three vertically oriented shafts provide support and means for driving the cleaning members as hereinafter described. The upright left shaft 30 is parallel with a medially disposed shaft 32 which in turn is parallel with a rightmost shaft 34. It is noted that each of the aforementioned shafts includes a worm gear segment 36 along the upper portion thereof. Further, each of the shafts are journaled at the upper ends thereof by a split flange and pillow box 38 as seen in FIGURES 2, 4 and 7 of the drawings. Two unitary cleaning blocks 28 are supported about horizontal axes by interconnecting shafts 40 affixed thereto. The remote ends of these shafts are rotatably received by sleeve members 42, while the adjacent ends are received in a common sleeve member 41.

Attention is directed to FIGURES 9 and 10 of the drawings which illustrates the connection between adjacent end of one of the shafts 40 and a mating portion of the sleeve 41. It is noted in FIGURE 9 that the shaft 40 is provided with a cylindrical projection 43. A bore 45 is formed concentrically in a mating portion of the sleeve 41, rotatably receiving the cylindrical projection. An elastomeric apertured washer 44 is concentrically disposed around the cylindrical projection 43 and sandwiched between the abutting surfaces of the sleeve 43 and the shaft 40. The elastomeric washer 44 affords a controlled frictional resistance to rotation between the shaft 40 and the sleeve 43 as hereinafter explained. Further, the sleeve 43 is provided with a detent mechanism which includes a bore 46 disposed adjacent and parallel to the bore 41. An aperture 50 is formed within the elastomeric washer 44 in an aligned position with bore 46. A spring loaded detent element 48 is disposed within the bore 46 and protrudes through the bore 50 formed in the elastomeric washer. This spring loaded detent element is adapted to be deceived by one of three recesses 51, 52 and 53 formed within the confronting face of the shaft 40. The recesses are clearly shown in FIGURE 10 of the drawings, the centrally disposed recess 52 being disposed between a leftmost recess 51 and a rightmost recess 53. Thus, upon rotation of the shaft 40 with respect to the sleeve member 43, the spring loaded detent 48 is forced into engagement with one of the aforementioned recesses thereby yieldably interlocking the sleeve 43 and the interconnecting shaft 40 in one of three angular positions. It is to be noted that the aforementioned recesses are disposed at equal radial distances from the shaft axis. As will be further noted, the detent mechanism permits discrete controlled angular displacement of the interconnecting shaft 40 and the affixed cleaning blocks 28, the purpose of which is to be hereinafter explained.

With continued reference to FIGURE 3 of the drawings, a selectively energized electric motor 54 drives a first bevel gear 56. A second bevel gear 58 enmeshed with gear 56 at right angles, drives horizontal shaft 60 disposed perpendicular to the worm gear shafts 30, 32 and 34. As shown in FIGURE 4, a number of shaft sections constituting shaft 60 may be linked by means of suitable shaft couplings 62. A hanger or bearing brace 64 disposed along an intermediate section of the shaft 60 renders support to said shaft. Split flanges and pillow blocks 66 and 68 fastened to vertical wall members support the left and right ends respectively of the shaft 60. The left end section of the shaw 60 includes a spiral gear 70 which is keyed to the shaft 60. The gear 70 meshes with the worm gear section 36 on the vertical shaft 30 thereby imparting rotation to the latter shaft when driven by the spiral gear 70. Similarly, a spiral gear 72 is provided in conjunction with the medial vertically disposed shaft 32. A similar gear arrangement is provided by a spiral gear 74 affixed to the right end of the shaft 60, the gear 74 imparting rotation to the rightmost vertical shaft 34. It is noted that rotation of the shaft 60 provides synchronous rotation of the three aforemention vertical shafts, said synchronous rotation occurring in the same sense.

As seen in FIGURE 2–4, a trough 76 is provided below the cleaning block 28 in its lowermost position thereby permitting the collection of liquid which has been sprayed onto a window pane. A drain pipe 78 conducts the liquid from the trough to a central sewer (not shown). FIGURE 4 shows a liquid spray conduit pipe 80 disposed perpendicularly of the three aforementioned worm gear shafts. The pipe includes suitable spray nozzles or orifices 82 which upwardly direct a spray of washing liquid onto the surface of a window pane to be cleaned. The leftmost end of the pipe includes a terminal fitting 84. The rightmost end 86 includes an elbow joint continuing vertically downwardly to a supply pipe 88, the latter clearly shown in FIGURE 2 of the drawings. As will be appreciated from viewing FIGURE 2, the water spray is directed onto a window pane 90 which is mounted between a ceiling 92 and an inside sill 94. A removable vertical panel 95 is provided below the sill 94 to provide access to the cleaning mechanism for maintenance purposes.

Attention is directed to FIGURE 2 of the drawings which illustrates the sill shield 26 pivotally mounted on the external side of the window assembly to permit displacement of the cleaning assembly from its lower stored position. The sill shield 26 is formed by an elongated plate of L-shaped cross-section generally denoted by the reference numeral 96 having a short leg portion 98. This L-plate structure is pivotally mounted by a suitable hinge pin 97 on the external panel 22. A place portion 100 appends outwardly from the right angle defined by the L-plate structure. The plate 100 forms an acute angle with the sill shield 26 as well as with the short leg portion 98. The sill shield 26 is normally retained by its hinge assembly in an almost horizontal position as clearly shown in FIGURE 2.

As will be appreciated by viewing FIGURE 2, the cleaning block 28 is characterized by a generally triangular cross-section in the illustrated embodiment. The apex edge 104 provides a means for rotating the block in a manner allowing alternate positioning of a sponge pad 110 and a squeegee wiper blade 112 against the glass window pane 90. The sponge pad 110 is suitably affixed to the lower leftmost edge of the block 28 as viewed in FIGURE 2 and appends outwardly therefrom. The wiper blade 112 generally characterized by a triangular cross-section is affixed to the upwardly leftmost edge of the block 28 and appends outwardly therefrom.

In actual operation of the device, FIGURE 2 illustrates the initial position of the cleaning block 28 within the enclosure 113 defined by the panels 22 and 95. As the motor 54 is energized to initiate upward movement of the blocks 28, water or cleaning fluid is sprayed onto the window panels. In this phase, the sill shield 26 is in its normal position and the block 28 is held by its detent mechanism in a neutral position with the detent 48 engaging recess 52. FIGURE 5 illustrates the condition of the cleaning block as it moves upwardly past the sill shield 26. It will be noted that the sponge pad 110 passes over the pivoted element 102 hinged to the inside sill 94 along the bottom edge of the window pane 90. This element can be displaced upwardly to the position shown in FIGURE 5 but cannot be displaced downwardly from the position shown in FIGURE 2. The apex edge 104 of the block contacts the plate 100 of the L-plate structure 96. This contact pushes the L-plate in a clockwise manner to an open position and then causes clockwise rotation of the block against the holding force of its detent mechanism to a position in which the detent 48 becomes engaged with the leftmost recess 51. At this time a suitable sensor (not shown) may stop the spraying of washing fluid from the nozzles 82 shown in FIGURE 4. The block then performs a sponging or scrubbing function as shown in FIGURE 6 of the drawings. The scrubbing operation is completed as shown in FIGURE 7 when the block 28 reaches the upward extreme of its travel. At this time, a mechanical stop 114 angularly displaces the block counterclockwise from its sponging position past the neutral position to a wiper position as shown by dotted lines in FIGURE 7 wherein the detent 48 engages recess 53. An appropriate sensing switch 116 reverses the direction of motor drive thereby causing the downward displacement of the cleaning block 28. This downward displacement is accompanied by contact between wiper blade 112 and the glass pane 90. The wiping operation is terminated as shown in FIGURE 8 when the apex edge 104 contacts the short leg portion 98 of the L-plate structure 96 and the wiper blade engages the hinged element 102 causing the block 28 to rotate counterclockwise. This will return the block 28 to its neutral position as it completes its downward movement to the initial lowermost position. As further indicated in FIGURE 8, the sill shield is also displaced to its normal closed position. As the block 28 is lowered into the enclosure 113, a sensing switch 116 shown in FIGURE 4 is actuated thereby deenergizing the electric motor 54 and completing an operational cycle.

Although the present invention has been described in terms of an automatic window washing system, it is within the purview of the present invention to selectably exclude operation of the water supply system thus permitting adaptation of the present invention for removal of fog or other condensation from a window pane. Further, it is within the purview of the present invention to adapt the present invention for the removal of ice or frost by adding to or replacing the cleaning fluid with a defrosting solvent.

It will also be appreciated that the present invention may be used on any type of building or mobile carrier with window structures therein.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A window cleaning apparatus for cleaning a planar surface comprising a first plurality of parallel worm gears, means for driving said worm gears in synchronism and in an identical sense, a second plurality of threaded sleeve members equal in number to said first plurality of worm gears operatively mounted on said worm gears, a third plurality of means interconnecting said sleeve members for simultaneous displacement longitudinally of said plurality of worm gears in a first direction, said interconnecting means being rotatably mounted by said sleeve means, a cleaning block having scrubbing means and wiping means mounted by said interconnecting means about a common axis and fixedly connected thereto, means for reversibly rotating said cleaning block, means for limiting rotation of said cleaning block between positions in which said planar surface is alternately contacted by said scrubbing means and said wiper means, and means for reversing the direction of said interconnecting means from said first direction to an opposite direction.

2. The apparatus set forth in claim 1 together with a housing disposed adjacent to said planar surface, said housing enclosing said cleaning means when spaced from said planar surface, said housing further including a pivotally openable side thereof, said side normally being disposed perpendicularly of said worm gears along a plane adjacent said planar surface thereby providing access for said cleaning block to and from said housing.

3. Apparatus for cleaning a surface comprising a housing enclosure fixedly mounted adjacent said surface, a cleaning member having a positioning axis, means movably mounting the cleaning member for movement of said axis in parallel spaced relation to the surface between limit positions, and means for angularly displacing said cleaning member about said positioning axis, shield means displaceable by the cleaning member between open and closed positions enclosing said cleaning member within the housing enclosure when spaced from said surface in one of said limit positions, reversible drive means operatively connected to the mounting means for upwardly moving said cleaning member from a lower of said limit positions below the surface to the upper one of said limit positions downwardly moving the cleaning member from said upper limit position to the lower limit positions, detent means for yieldably holding the cleaning member in different angularly spaced cleaning positions while moving upwardly and downwardly along the surface and in an inactive position below the surface, and one-way camming means mounted by the shield means and the housing for angularly displacing the cleaning member to one of the cleaning positions while moving upwardly and to the inactive position while moving downwardly.

4. The combination of claim 3 including spray means mounted within the housing enclosure for upwardly discharging fluid onto the vertical surface past the cleaning member in the inactive position.

5. The combination of claim 4 including sponge and wiper elements mounted by the cleaning member in wiping contact with the surface only in the cleaning positions of the cleaning member.

6. Apparatus for cleaning a surface comprising a housing enclosure fixedly mounted adjacent said surface, a cleaning member having a positioning axis, means movably mounting the cleaning member for movement of said axis in parallel spaced relation to the surface between limit positions, and means for angularly displacing said cleaning member about said positioning, axis detent means for yieldably holding the cleaning member in different angularly spaced cleaning positions while moving upwardly and downwardly along the surface and in an inactive position below the surface, and one-way caming means mounted by the housing for angularly displacing the cleaning member to one of the cleaning positions while moving upwardly and to the inactive position while moving downwardly.

7. Apparatus for cleaning a surface comprising a housing enclosure fixedly mounted adjacent said surface, a cleaning member having a positioning axis, means movably mounting the cleaning member for movement of said aixs in parallel spaced relation to the surface between limit positions, and means for angularly displacing said cleaning member about said positioning axis, the means for movably mounting the cleaning member comprising a shaft axially securing the cleaning member thereto, a bored support for receiving the shaft therein, and further wherein the means for angularly displacing the cleaning member includes detent means operatively connected between the shaft and the bored support for yieldably holding the cleaning member in different angularly spaced cleaning positions while moving upwardly and downwardly along the surface and in an inactive posi- below the surface.

8. Apparatus for cleaning a surface comprising a housing enclosure fixedly mounted adjacent said surface, a cleaning member having a positioning axis, means movably mounting the cleaning member for movement of said axis in parallel spaced relation to the surface between limit positions, and means for angularly displacing said cleaning member about said positioning axis, detent means for yieldably holding the cleaning member in different angularly spaced cleaning positions while moving upwardly and downwardly along the surface and in an inactive position below the surface, the cleaning member including sponge and wiper elements mounted thereon for effecting wiping contact with the surface only in the cleaning position of the cleaning member, the cleaning member being characterized by an elongated prismatic body, the body having a uniform cross-sectional profile comprising a generally isosceles triangle portion having an apex and an angularly inwardly extending base, the base of the profile completing a four sided profile figure.

References Cited
UNITED STATES PATENTS

| | | | |
|---|---|---|---|
| 1,633,479 | 6/1927 | De Rosa | 15—250.1 XR |
| 2,725,582 | 12/1955 | Meyeroff | 15—103 XR |
| 2,740,151 | 4/1956 | Wayne | 15—250.03 |
| 2,940,110 | 6/1960 | Neal | 15—250.04 |
| 3,292,196 | 12/1966 | Windorf | 15—250.19 XR |
| 3,298,052 | 1/1967 | Wolfe | 15—50 XR |
| 3,344,454 | 10/1967 | Mikalson | 15—50 |
| 3,378,875 | 4/1968 | Kern | 15—250.04 |

PETER FELDMAN, Primary Examiner

U.S. Cl. X.R.

15—50, 103, 250.19